UNITED STATES PATENT OFFICE.

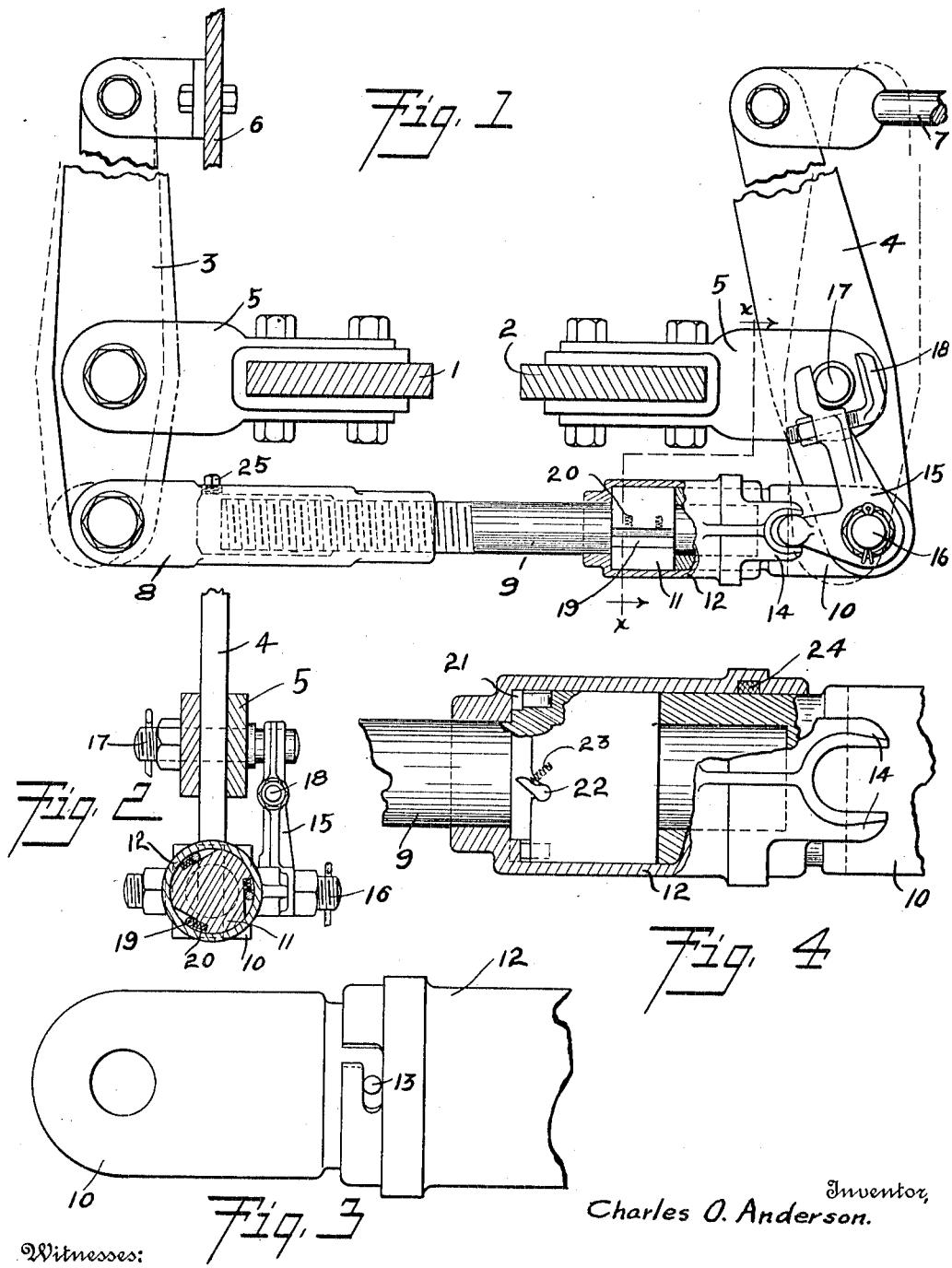

CHARLES O. ANDERSON, OF OMAHA, NEBRASKA, ASSIGNOR OF ONE-FOURTH TO A. T. AUSTIN, ONE-FOURTH TO WILSON A. AUSTIN, AND ONE-SIXTH TO ALBERT A. McCLURE, ALL OF OMAHA, NEBRASKA.

SLACK-ADJUSTER FOR BRAKES.

1,084,834.  Specification of Letters Patent.  Patented Jan. 20, 1914.

Application filed April 20, 1912. Serial No. 692,153.

*To all whom it may concern:*

Be it known that I, CHARLES O. ANDERSON, a citizen of the United States, and a resident of Omaha, in the county of Douglas and State of Nebraska, have invented certain new and useful Improvements in Slack-Adjusters for Brakes, of which the following is a specification.

My invention relates to railway brake rigging and more particularly to devices for automatically compensating for slack in the brake connections, especially that caused by wear of the brake-shoes.

It is the object of my invention to provide a simple, durable and inexpensive mechanism for the above purpose.

Constructions embodying my invention are illustrated in the accompanying drawings, in which—

Figure 1 is a side view, partly in section, of the adjusting device as applied to the truck-levers of an ordinary form of brake rigging, Fig. 2 is a transverse vertical sectional view taken on the plane indicated by the line *x—x* of Fig. 1, Fig. 3 is a detail showing the connection between the oscillating sleeve and the head of the connecting member, and Fig. 4 is a detail sectional view showing a modified form of the motion-directing device.

In the drawings the parts shown which are of ordinary construction and arrangement are the brake-beams 1 and 2, the truck-levers 3 and 4, and the clevises or connecting links 5 between the truck-levers and brake-beams. The lever 3 is that usually designated as the dead-lever, and the upper end thereof is connected to a part of the truck-frame 6. The lever 4 is that ordinarily referred to as the live-lever and its upper end is connected with the rod 7 which extends to the usual brake actuating devices, which may be either hand or fluid-pressure controlled. It will be understood that the brake-beams 1 and 2 are supported in any ordinary manner, that they carry brake-shoes adapted to engage the car wheels, that they are moved toward the wheels, or to applied position, by tension upon the rod 7, and that when the tension on the rod 7 is relaxed the brake-shoes are moved away from the wheels, or to release position, by release-springs arranged in the usual way.

The lower ends of the truck-levers are connected to each other by a member variable in length to compensate for wear of the brake-shoes or for slack caused by wear in any part of the connections. My invention provides a means for automatically causing a variation in the length of said connecting member whenever the movement of the truck-levers in applying and releasing the brakes exceeds a predetermined amount. The said truck-lever connecting member comprises a head 8 pivotally connected with the lever 3, a rod 9 of which one end is threaded and screwed into the head 8, and a head 10 which is pivotally connected with the lever 4, the unthreaded end of the rod 9 extending rotatably into a recess or socket therefor made in the head 10. Adjoining the end of the head 10 the rod 9 is provided with a collar 11, and around the collar and said end of the head is disposed a cylindrical sleeve 12 of which the end is shouldered inwardly and fits around the rod 9 adjoining the outer end of the collar. At one side the said sleeve 12 has an L-shaped slot therein, and a pin 13 is provided on the head 10, as shown in Fig. 3, the arrangement being such that the sleeve can be moved longitudinally, to remove it from the head, only when the pin is in the longitudinally extending part of the slot, and when the pin is in the transverse portion of the slot the sleeve can have an oscillating movement around the head but cannot be moved longitudinally thereof. Thus when the pin is in the transverse portion of the L-shaped slot it serves to hold together the head 10, the sleeve 12 and the rod 9, since the rod, by the engagement of its collar 11 with the sleeve, cannot be removed from the head without the sleeve being taken with it. On the side of the sleeve opposite the L-shaped slot there is a fork or pair of fingers 14 which fit over the rounded end of a bell-crank 15. The said bell-crank is fulcrumed on the end portion of the pivot-pin 16 by which the head 10 is connected with the lower end of the live-lever 4. The bell-crank has an upwardly extending arm which is forked at the end and straddles the end portion of the pin 17 which connects the lever 4 to the clevis 5. One side of the forked end of the bell-crank arm is formed by a finger 18 which has a threaded stem screwed through the body of the arm so that by turning the stem the space between the forks may be varied. The said space is so adjusted that the normal movement of the truck-levers can be made without causing movement of the bell-crank on its fulcrum. Whenever the movement of the lever 4, in the applying and releasing of the brakes, is greater than the normal, then the bell-crank is moved and, in turn, actuates the sleeve 12, the movement thereof being in one direction as the brakes are applied and being in the other direction as the brakes are released. This oscillating movement of the sleeve is utilized to turn the threaded rod 9 relatively to the head 8 and thus to vary the length of the connecting member between the truck-levers 3 and 4 to compensate for the slack of the connections which permitted the abnormal movement of the truck-levers.

In the construction illustrated the compensation for slack is effected by lengthening of the connecting member, and, in order that the movement of the sleeve in alternating directions may turn the rod 9 only in the proper direction for lengthening the member, I employ motion-directing connecting means between the sleeve and rod. By said means the movement of the sleeve in one direction is communicated to the rod and the movement of the sleeve in the other direction is made without causing movement of the rod.

The motion-directing means shown in Figs. 1 and 2 is a roller-clutch comprising several rollers 19 disposed in longitudinal grooves in the collar 11. The grooves at one side are greater in depth than the diameter of the rollers, and small coil springs 20 are arranged in recesses adjoining said sides of the grooves, so as to press the rollers yieldingly toward the shallower sides of the grooves and thus hold them in engagement with the inner surface of the sleeve. When the sleeve is turned in one direction the rollers tend to move into said deep sides of the grooves so that the collar and rod are not actuated by such movement of the sleeve. When the sleeve is turned in the other direction, however, the rollers tend to move toward the shallow sides of the grooves and thus to wedge between the collar and sleeve so that movement of the sleeve will be communicated to the collar and the rod 9. It should be noted that the parts are so arranged that when the rod 9 is turned by the sleeve the movement occurs as the brakes are released, the longitudinal stress in the connecting member at this time being slight and, as a consequence, there being but little friction between the rod 9 and the heads 8 and 10. The movement of the sleeve which is not used to turn the rod occurs as the brakes are applied, there being at this time a relatively large longitudinal stress in the connecting member and, accordingly, a greater friction between the rod and the heads. Thus the movement of the rod 9 is made at the most advantageous time, or when there is but little friction to be overcome. Also, upon the reverse movement of the sleeve, no matter how tightly the clutch-rollers 19 might become wedged between the collar and sleeve, the friction to be overcome in order to turn the threaded rod is such as to insure the releasing of the clutch-rollers and prevent any reversal of movement of the threaded rod.

In Fig. 4 is shown a slightly different form of motion-directing device. In the said structure the sleeve is provided on its inner end surface with ratchet-teeth 21, and in the end of the collar 11 are disposed several pawls 22, having springs 23 which hold them normally so that they engage the ratchet-teeth. The pawls are preferably so arranged with reference to the teeth that when one of them is engaged by one of the teeth so that the collar will be actuated by movement of the sleeve, the other pawls will be at varying distances from the engaging position. Thus, if four pawls are used, when one is in engaging position the other three will be respectively at one-fourth, one-half and three-fourths of a tooth-space from the engaging position. By this arrangement movements of the sleeve as slight as one-fourth of the pitch of the ratchet-teeth may be communicated to the rod 9.

It should be noted that in both forms of the motion-directing device the parts thereof are completely inclosed and protected by the sleeve. To assist in the exclusion of dust and the like from the inside of the sleeve, the same may be provided with an internal annular groove filled with a packing material 24, as shown in Fig. 4. The part of the head 8 into which the rod 9 extends is preferably hollowed out as indicated by dotted lines in Fig. 1, thus forming a space for lubricating material which may be introduced thereinto through an opening normally closed by a screw-plug 25.

Now, having described my invention, what I claim and desire to secure by Letters Patent is:

1. In a slack adjuster, dead and live truck-levers, a member connecting said levers, said member comprising two heads pivotally connected to the respective levers, and an intermediate rod having a threaded connection with one of the heads and a rotatable connection with the other head, a sleeve rotatably mounted on the latter head, means for holding said sleeve in a fixed longitudinal relation to the head, the sleeve being adapted to retain the threaded rod also in fixed longitudinal relation to said head, means for oscillating the sleeve by movements of the truck-levers greater than the normal, and motion-directing means inclosed by the sleeve for communicating to the threaded rod the movements of the sleeve in one direction.

2. In a slack adjuster, a brake-lever connecting member comprising heads and an intermediate rod having a threaded connection with one of the heads and rotatably engaging the other head, a sleeve rotatably mounted on the latter head, means for retaining the sleeve and rod in fixed longitudinal relation to the said head, means for oscillating the sleeve by movements of the brake-levers greater than the normal, and a roller-clutch device inclosed by the sleeve and adapted to communicate to the rod the movements of the sleeve in one direction.

3. In a brake rigging, live and dead truck-levers, a connecting member having heads connected to the respective levers and an intermediate rod screwed into one of the heads and fitting rotatably in the other head, a sleeve fitting rotatably upon the latter head and a part of the rod, means connecting said sleeve and head for retaining them and the rod in fixed longitudinal relation, a lever connecting the sleeve and one of the truck-levers whereby excessive movement of said lever in applying and releasing the brakes will rotate the sleeve in alternating directions, and means for communicating the movements of the sleeve in one direction to the rod.

4. In a brake rigging, truck-levers, a connecting member having heads connected with the truck-levers and an intermediate rod movable relatively to the heads, one end of the rod having a collar adjoining the end of the respective head, a sleeve fitting upon the rod and inclosing the collar and a part of the head, means connecting the sleeve and head to prevent the sleeve and rod being withdrawn from the head, means for oscillating the sleeve, rollers disposed in angular pockets in the collar adjoining the sleeve, and means for yieldingly holding the rollers in engagement with the sleeve.

5. In a brake rigging, truck-levers, a connecting member having heads connected with the truck-levers and an intermediate rod screwed into one of the heads and fitting rotatably in the other head, the rod having a collar adjoining the end of the latter head, a sleeve fitting upon the rod and inclosing the collar and a part of the head, means controlled by the truck-levers for rotating the sleeve in alternating directions, clutching means inclosed by the sleeve and connecting the sleeve and collar, and packing means for excluding foreign matter from within the sleeve.

6. In a brake rigging, truck-levers, a connecting member having heads connected with the truck-levers and an intermediate rod movable relatively to the heads, one end of the rod having a collar adjoining the end of the respective head, a sleeve fitting upon the rod and inclosing the collar and a part of the head, and means connecting the sleeve and head to prevent the sleeve and rod being withdrawn from the head.

In testimony whereof I have hereunto subscribed my name in the presence of two witnesses.

CHAS. O. ANDERSON.

Witnesses:
  WILSON A. AUSTIN,
  A. A. MCCLURE.

---

Copies of this patent may be obtained for five cents each, by addressing the "Commissioner of Patents, Washington, D. C."